UNITED STATES PATENT OFFICE.

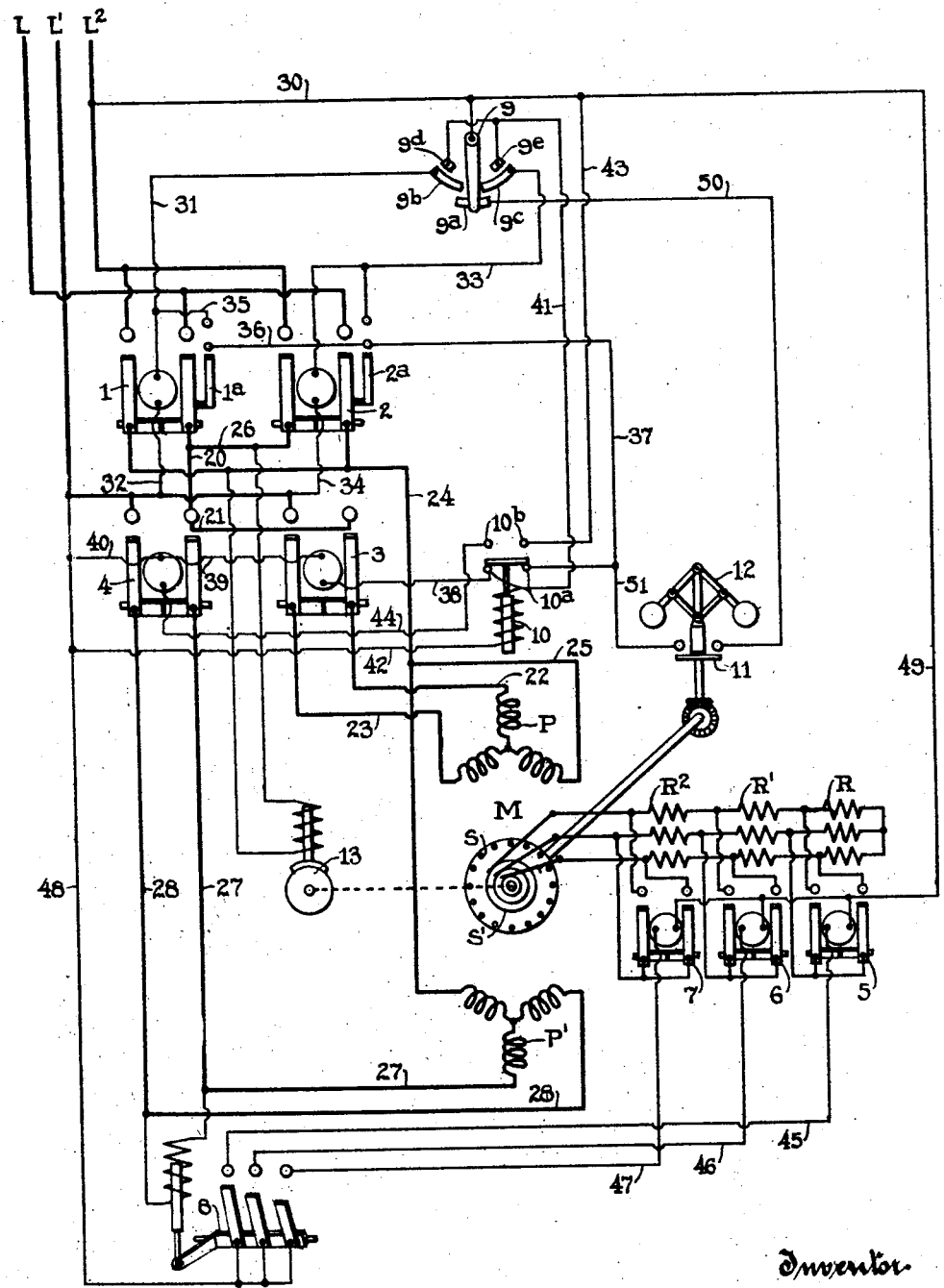

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,313,688.	Specification of Letters Patent.	Patented Aug. 19, 1919.

Application filed April 15, 1916. Serial No. 91,390.

*To all whom it may concern:*

Be it known that I, CLARK T. HENDERSON, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

This invention relates to improvements in motor controllers.

It has been proposed to employ for elevator service a special alternating current motor having a primary winding acting with a high torque squirrel cage type secondary for relatively slow speed and a second primary winding acting with a slip ring secondary for relatively high speed, and this invention has among its objects to provide an efficient, flexible and reliable controller for motors of this type.

A further object of the invention is to provide a controller for motors of the aforesaid type which will insure against sudden and jerky stops by a quick return thereof to off position from high speed position.

Various other objects and advantages of the invention will hereinafter appear.

The accompanying drawing schematically and diagrammatically illustrates one embodiment of the invention which will now be described, it being understood that the invention may be embodied in other forms falling within the scope of the appended claims.

The motor M is schematically illustrated as of the type above mentioned, the same being provided with primary windings P and P', a squirrel cage secondary S and a slip ring secondary S'. The primary winding P, which it may be assumed has 24 poles, coacts with the secondary S for slow speed high torque operation of the motor, while the primary winding P', which it may be assumed has 8 poles, coacts with the secondary S' for high speed operation of said motor. The primary windings of the motor are each of the three phase type and are adapted to be selectively connected to a three phase source L, L' and L².

The controller illustrated includes electromagnetic reversing switches 1 and 2 common to the circuits of the two primary windings of the motor, an electromagnetic switch 3 controlling the continuity of the circuit of primary winding P, an electromagnetic switch 4 controlling the continuity of the circuit of primary winding P', electromagnetic accelerating switches 5, 6 and 7 controlling resistances R, R' and R² in the slip ring circuit of the motor and an electroresponsive relay switch 8 controlling said accelerating switches. Also, the controller includes a master switch 9 to selectively energize reversing switches 1 and 2 and to govern the switches 3 and 4 for selective energization of the primary windings of the motor, through the medium of a relay 10. Further, a switch 11 operable by a fly ball governor 12 driven by the motor M is provided to coöperate with the master switch to control the slow speed switch 3 in the manner hereinafter described for slow speed purposes and an electromagnetically released mechanical brake 13 is provided to finally bring the motor to rest.

Briefly describing the operation and functions of the controller without detailing the circuits, movement of the master switch 9 to the left energizes switch 1. Switch 1, which it will be assumed is the "up" switch, thereupon responds, to energize the releasing coil of the mechanical brake 13 and through its auxiliary contacts 1ª energizes switch 3 through down contacts 10ª of relay 10. Switch 3 thereupon responds to connect the primary winding P to the supply circuit for slow speed operation of the motor. Then if the operation of the master switch 9 be continued it will energize relay 10 to interrupt the circuit of switch 3 and to complete the circuit of switch 4 through up contacts 10ᵇ. Switch 4 will then respond to connect primary winding P' to the line for high speed operation of the motor and at the same time energize relay 8 to effect progressive response of accelerating switches 5, 6 and 7. On the other hand, if the master switch be moved to the right it will first energize switch 2 and effect the same sequence of operation of the other switches for reverse operation of the motor, said switch 2 serving to reverse certain of the power connections and having auxiliary contacts 2ª functioning in the same manner as the auxiliary contacts of switch 1.

Assuming now that the motor is in operation at high speed in either direction, it may be slowed down by return of the master switch to a sufficient extent to deënergize relay 10, thus effecting interruption of the circuit of switch 4 and reëstablishment of the circuit of switch 3. Then if it be desired to stop the motor the controller is moved to off position whereupon under normal conditions all of the magnetic switches will be deënergized to thereby disconnect the motor from circuit and release the mechanical brake for setting thereof. On the other hand, if, when the master switch is returned to off position the motor continues to operate at a speed in excess of a given valve, switch 11, operated by the fly ball governor, will close or remain closed to establish a maintaining circuit for switch 3 and for the then closed reversing switch. The switch 11 is set to close only at a speed in excess of the synchronous speed of the motor M when operating as a squirrel cage motor and hence while slowing down the retention of the power switches in closed position will cause the motor to act as a brake and to so continue to operate until it is restored to its lower synchronous speed. Thereupon the switch 11 will open and thereby deënergize the power switches to disconnect the motor from circuit. Moreover, as will hereinafter appear, the circuit arrangement is such that the aforesaid braking action will be insured even though the master switch be returned immediately to off position from high speed position so that a gradual slow-down will be insured regardless of the handling of the master switch. When the motor is disconnected from circuit the winding of brake 13 is deënergized and said brake thereupon sets to bring the motor to rest.

More specifically describing the circuit arrangement illustrated the power circuits are as follows: With switches 1 and 3 closed a circuit is established from line L through the right hand pole of switch 1, by conductors 20 and 21 through the right hand pole of switch 3, by conductor 22 to the middle terminal of primary winding P, while circuit is closed from line L' through the left hand pole of switch 3, by conductor 23 to the left hand terminal of winding P and from line $L^2$ through the left hand pole of switch 1, by conductors 24 and 25 to the right hand terminal of winding P. With switches 2 and 3 closed circuit is established from line L through the right hand pole of switch 2, by conductors 24 and 25 to the right hand terminal of winding P, while circuit is established as previously described from line L' to the left hand terminal of winding P and from line $L^2$ through the left hand pole of switch 2, by conductors 26, 20 and 21 through the right hand pole of switch 3, by conductor 22 to the middle terminal of winding P, which obviously provides for reversal of the motor. With switches 1 and 4 closed circuit is established from line L through the right hand pole of switch 1, by conductor 20 through the right hand pole of switch 4, by conductor 27 to the middle terminal of winding P', while circuit is established from winding L' through the left hand pole of switch 4 by conductor 28 to the right hand terminal of winding P' and from line $L^2$ through the left hand pole of switch 1, by conductor 24 to the left hand terminal of winding P'. With switches 2 and 4 closed line L is connected through the right hand pole of switch 2, by conductor 24 to the left hand terminal of winding P', while line L' is connected as previously described to the right hand terminal of said winding and line $L^2$ through the left hand pole of switch 2 by conductors 26 and 20 through the right hand pole of switch 4, by conductor 27 to the middle terminal of winding P', with the result of providing for reversal of the motor. The connections for the slip ring secondary of the motor are obvious and require no specific description. As will be apparent the switch 5 serves to short-circuit the resistances R while the switch 6 serves to short-circuit the resistances R' and the switch 7 the resistances $R^2$.

The control circuits are as follows: With the arm of the master switch in contact with the left hand segment $9^b$ circuit is established from line $L^2$ by conductor 30, through said arm and segment, by conductor 31 through the winding of switch 1, by conductor 32 to line L', which provides for energization of said switch. On the other hand, when the arm of said master switch is moved into engagement with right hand segment $9^c$ circuit is established from line $L^2$ through said arm and segment, by conductor 33 through the winding of switch 2, by conductor 34 to line L' which provides for energization of said switch. Upon response of switch 1 circuit is closed from conductor 31 by conductor 35 through the auxiliary contacts $1^a$ of said switch, by conductors 36 and 37 through the down contacts of relay 10, by conductor 38 through the winding of switch 3, by conductors 39 and 40 to line L', which provides for energization of said latter switch. Alternatively when switch 2 is closed circuit is established from conductor 33 through the auxiliary contacts $2^a$ of said switch to conductor 37 and thence through the winding of switch 3 as already traced. When now the arm of the master switch is moved to engage either the left hand segment $9^d$ or the right hand segment $9^e$ circuit is completed from line $L^2$ through said arm and one of said segments to conductor 41 and thence through the winding of relay 10, by conductor 42 to line L'. This provides for energization of relay 10, which upon responding opens the circuit of switch 3 and completes a circuit from line L² by conductors 30 and 43 through the up contacts of said relay, by conductor 44 through the winding of switch 4, by conductor 40 to line L'. This provides for energization of switch 4 which upon responding connects the winding of relay 8 across lines 28 and 27. Relay 8, which is of a conventional type, then responds to progressively connect the windings of switches 5, 6 and 7 by conductors 45, 46 and 47 to conductor 48 and thence to line L', the opposite terminals of all of said windings being connected by a common lead 49 to conductor 30 and thence to line L², which provides for progressive energization of said switches. The winding of brake 13 is connected across the lines L and L² directly back of the switches 1 and 2 and hence is adapted to be energized immediately upon closure of either of said switches.

With the motor operating at high speed, that is, with either switch 1 or switch 2 closed and switch 4 closed, return of the master switch to off position tends to deënergize all switches. However, before the arm of the master switch disengages either segment 9ᵇ or segment 9ᶜ it engages the overlapping segment 9ᵃ and if the motor is running above its lower synchronous speed, circuit will at once be completed from line L² to segment 9ᵃ, by conductor 50 through switch 11, by conductors 51 and 37 to and through the auxiliary contacts of the closed reversing switch and thence through the winding of such switch to line L'. Thus is provided a maintaining circuit for the closed switch, and, as just set forth, this circuit is established before the arm of the master switch is disengaged from segments 9ᵇ or 9ᶜ. Also, circuit is at the same time established from segment 9ᵃ through switch 11, by conductor 51 through the down contacts of relay 10, by conductor 38 through the winding of switch 3 and thence to line L' which again effects energization of switch 3 to reconnect the primary winding P in circuit. Thereupon the motor will act as a brake so long as the same is overhauled by its load or until such time as the speed is sufficiently reduced to open relay switch 11. Then circuit is interrupted to all of the electromagnetic switches while the circuit of the brake coil is deënergized to permit said brake to set.

While the controller illustrated is primarily designed for the special type of motor described, it is to be understood that certain features thereof may be advantageously employed in other relations and it is to be further understood that certain of the appended claims are not limited to the specific application of the controller herein discussed.

What I claim as new and desire to secure by Letters Patent is:

1. In a controller for electric motors having separate slow speed and high speed windings, in combination, separate control switches for the motor windings, common reversing means for the motor windings separate from said switches, said reversing means and said switches coöperating to connect the motor windings in circuit selectively for operation of the motor at selective speeds in either direction, and controlling means for said switches providing for operation of the slow speed switch prior to operation of the high speed switch.

2. In a controller for electric motors having separate slow speed and high speed windings, in combination, separate control switches for the motor windings and common reversing means for the motor windings, said reversing means and said switches coöperating to connect the motor windings in circuit selectively for operation of the motor at selective speeds in either direction, said reversing means upon actuation tending to effect immediate actuation of the switch controlling the slow speed winding of the motor.

3. In a controller for electric motors having separate slow and high speed windings, in combination, separate electro-responsive control switches for the motor windings, common electro-responsive reversing means for said windings, said means upon responding tending to effect immediate response of the control switch of the slow speed winding and control means to effect energization of said reversing means and the last mentioned switch for operation of the motor in opposite directions selectively and to thereafter effect deënergization of said last mentioned switch and energization of the other of said switches.

4. In a controller for electric motors having separate slow and high speed windings, in combination, an electro-responsive slow speed switch controlling the former winding, an electro-responsive high speed switch controlling the latter winding, common electro-responsive reversing means for said windings, said reversing means upon response tending to effect response of the slow speed switch and control means to effect energization of said reversing means and said slow speed switch for operation of the motor in opposite directions selectively and to effect deënergization of said slow speed switch and energization of said high speed switch, said control means including a common control device for said switches to normally interrupt the circuit of the high speed switch and to necessitate energization of said switches selectively.

5. In a controller for electric motors having separate slow and high speed windings, in combination, an electro-responsive slow speed switch controlling the former winding, an electro-responsive high speed switch controlling the latter winding, electro-responsive reversing switches common to said windings, and control means to effect selective energization of said reversing switches and also of said control switches for operation of the motor in either direction and at either of two speeds.

6. In a controller for electric motors having separate slow and high speed windings, in combination, an electro-responsive slow speed switch controlling the former winding, an electro-responsive high speed switch controlling the latter winding, electro-responsive reversing switches common to said windings, and control means to effect selective energization of said reversing switches and also of said control switches for operation of the motor in either direction and at either of two speeds, said control means including a control relay common to both of said control switches to selectively interrupt the circuits thereof and means whereby each of said reversing switches upon response tends to effect response of said slow speed switch.

7. In a controller for alternating current motors, having separate primary windings for slow and high speed operation thereof, in combination, means to establish power connections for such windings selectively and automatic means tending to insure reestablishment of power connections for the slow speed winding when the high speed winding is disconnected at a speed of the motor exceeding its lower synchronous speed.

8. In a controller for alternating current motors, having separate primary windings for slow and high speed operation thereof, in combination means to establish power connections for such windings selectively and means acting automatically under certain speed conditions to insure establishment of power connections for the slow speed winding of the motor upon interruption of the power connections for the high speed winding, said last mentioned means thereafter acting automatically under certain speed conditions to effect interruption of the power connections for said slow speed winding.

9. In a controller for alternating current motors having separate primary windings for slow and high speed operation thereof, in combination, electromagnetic switches to establish power connections for such windings selectively and to disconnect both from circuit and means acting automatically under certain speed conditions to energize certain of said switches to reëstablish power connections for the slow speed winding when the high speed winding is disconnected from circuit and to thereafter effect interruption of said connections.

10. In a controller for alternating current motors, having separate primary windings for slow and high speed operation thereof, separate electro-responsive control switches for such windings, electro-responsive reversing means common to said windings and adapted to coöperate with said control switches to establish power connections for said switches selectively and means acting automatically when the high speed winding is disconnected from circuit at a speed of the motor exceeding a predetermined value to establish a maintaining circuit for said reversing means and an energizing circuit for the control switch of the slow speed winding of the motor, said means thereafter acting automatically to interrupt said circuits for disconnection of the motor when reduced to said given speed value.

11. In a controller for alternating current motors having separate primary windings for slow and high speed operation thereof, in combination, separate electro-responsive control switches for such windings, electro-responsive reversing means common to said windings, control means including a master switch to effect energization of said reversing means and selective energization of said control switches, and automatic means governing said reversing means and said slow speed switch to insure energization thereof following the movement of said master switch from high speed position to off position as long as the speed of the motor exceeds a predetermined value.

12. In a controller for alternating current motors having separate slow and high speed windings, in combination, separate electro-responsive switches for the slow and high speed windings of the motor, electro-responsive reversing switches common to said windings, control means including a master switch to effect selective energization of said reversing switches and also of said control switches, and means governable by the speed of the motor and acting under predetermined speed conditions to insure against deënergization of said reversing switches by said master switch and to energize the control switch for the slow speed winding upon deënergization of the control switch for the high speed winding.

13. In a controller for electric motors having slow speed and high speed windings, in combination, separate control switches for the motor windings, reversing means for the motor windings operable independently of said switches, said reversing means and said switches coöperating to connect the motor windings in circuit selectively for operation of the motor at selective speeds in either direction and means rendering the slow speed switch operable immediately upon operation of said reversing means while delaying operation of the high speed switch.

14. In a controller for electric motors having slow speed and high speed windings, in combination, separate electro-responsive switches for controlling the motor windings, reversing means for the motor windings operable independently of said switches and controlling the energizing circuits of said switches and control means for said switches normally set to delay response of the high speed switch while permitting response of the slow speed switch immediately upon operation of said reversing means.

15. In a controller for electric motors having slow speed and high speed windings, in combination, separate electro-responsive switches for controlling said windings, a pair of electro-responsive reversing switches each being included in circuit with said control switches, circuit connections rendering the energization of said control switches dependent upon prior response of one of said reversing switches and an electro-responsive relay normally set to interrupt the circuit of the high speed switch and responsive to complete the circuit thereof and to interrupt the circuit of the slow speed switch.

In witness whereof, I have hereunto subscribed my name.

CLARK T. HENDERSON.